United States Patent [19]

Weaver et al.

[11] 4,407,749

[45] Oct. 4, 1983

[54] AZO DYES FROM 2-SULFONATED, SULFATED OR THIOSULFATED ORGANOTHIOTHIADIAZOLE AND ANILINE, TETRAHYDROQUINOLINE, OR BENZOMORPHOLINE COUPLERS

[75] Inventors: Max A. Weaver; Clarence A. Coates, Jr.; John G. Fisher, all of Kingsport, Tenn.

[73] Assignee: Eastman Kodak Company, Rochester, N.Y.

[21] Appl. No.: 383,885

[22] Filed: Jun. 1, 1982

Related U.S. Application Data

[63] Continuation-in-part of Ser. No. 174,055, Jul. 31, 1980, abandoned.

[51] Int. Cl.$^3$ ................. C09B 29/049; C09B 29/08; C09B 29/36; C09B 29/44
[52] U.S. Cl. ................. 260/155; 260/141; 260/154; 260/156; 260/157; 260/158; 548/135
[58] Field of Search ............... 260/158, 155, 154, 156, 260/157, 152

[56] References Cited

U.S. PATENT DOCUMENTS

| | | | |
|---|---|---|---|
| 3,221,006 | 11/1965 | Moore et al. | 260/158 |
| 3,441,554 | 4/1969 | Hahn et al. | 260/158 |
| 3,468,873 | 9/1969 | Meininger et al. | 260/158 |
| 3,621,007 | 11/1971 | Hahn et al. | 260/158 |
| 3,657,187 | 4/1972 | Weaver et al. | 260/158 |
| 3,657,215 | 4/1972 | Weaver et al. | 260/158 |
| 3,762,861 | 10/1973 | Weaver et al. | 260/158 |
| 3,770,370 | 11/1973 | Weaver et al. | 260/158 |
| 4,046,754 | 7/1977 | Meininger et al. | 260/162 |
| 4,070,352 | 1/1978 | Maner et al. | 260/155 |

FOREIGN PATENT DOCUMENTS 2036775  7/1980  United Kingdom ................ 260/159

*Primary Examiner*—Floyd D. Higel
*Attorney, Agent, or Firm*—Donald W. Spurrell; Daniel B. Reece, III

[57] ABSTRACT

Disclosed are azo dyes having the general formula

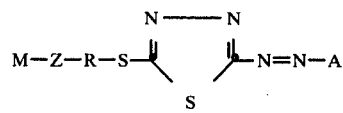

in which A is the residue of an aniline, tetrahydroquinoline or benzomorpholine disperse dye coupling component, R is a divalent organic radical such as straight or branched, lower or cyclic aliphatic or arylene, each of which may be substituted, Z is $SO_3$, $SO_4$ or $SSO_3$, and M is hydrogen, an alkali metal or ammonium. These dyes produce orange to bluish red shades and exhibit one or more improved properties such as dyeability, light fastness, blooming, pH stability, build, and the like on, for example, polyamide, wool, and cellulose ester fibers.

11 Claims, No Drawings

AZO DYES FROM 2-SULFONATED, SULFATED OR THIOSULFATED ORGANOTHIOTHIADIAZOLE AND ANILINE, TETRAHYDROQUINOLINE, OR BENZOMORPHOLINE COUPLERS

This is a continuation-in-part application of Ser. No. 174,055, filed July 31, 1980, now abandoned.

This invention concerns azo dyes having the general formula

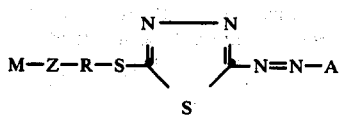

in which A is the residue of an aniline, tetrahydroquinoline or benzomorpholine disperse dye coupling component, R is a divalent organic radical such as lower straight, lower branched or cyclic aliphatic or arylene or combination thereof, each of which may be substituted and selected for example from

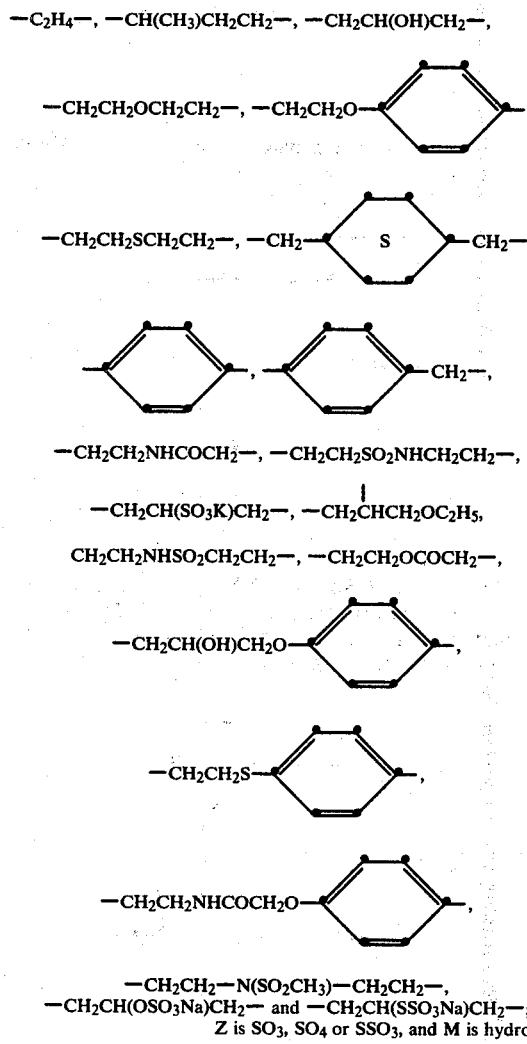

$-CH_2CH_2-N(SO_2CH_3)-CH_2CH_2-$,
$-CH_2CH(OSO_3Na)CH_2-$ and $-CH_2CH(SSO_3Na)CH_2-$;
Z is $SO_3$, $SO_4$ or $SSO_3$, and M is hydrogen, an alkali metal or ammonium. Substituents pendant from or within the chain of the R groups include $-O-$, $-S-$, $-NHCOCH_2-$, $-SO_2NH-$, $-SO_3K$,

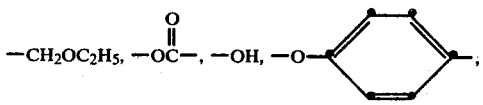

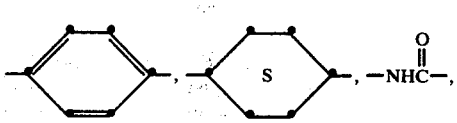

$-\overset{|}{N}-SO_2CH_3$, $-OSO_3Na$, $-SSO_3Na$, and the like. These dyes produce red to bluish red shades and exhibit one or more improved properties such as dyeability, dye exhaustion rate, light fastness, blooming, pH stability, build, crock, wash, ozone and nitrogen oxide fastness and the like on, for example, polyamide, wool, and cellulose ester fibers.

The couplers useful in the present invention have the formulae

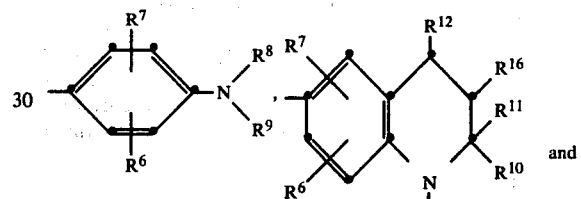

and

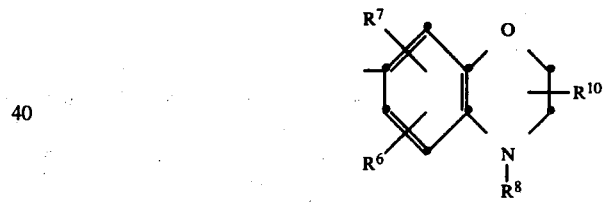

wherein $R^6$ and $R^7$ are each selected from hydrogen, fluorine, chlorine, bromine, lower alkyl, cycloalkyl, lower alkoxy, phenoxy, lower alkylthio, arylthio, and radicals having the formula $-NH-X-R^{13}$ in which X is $-CO-$, $-COO-$, or $-SO_2-$ and $R^{13}$ is selected from aryl, cycloalkyl, lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is $-CO-$, $R^{13}$ also can be hydrogen, amino, lower alkylamino, lower alkylcarbamoyl, lower dialkylamino, arylamino, or furyl;

$R^8$ and $R^9$ are selected from hydrogen; cycloalkyl; cycloalkyl substituted with one or two groups selected from lower alkyl; $-OH$, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl, straight or branched alkyl of 1-8 carbons and such alkyl substituted with the following: hydroxy; halogen; cyano; succinimido; glutarimido;

phthalimido; 2-pyrrolidono; cyclohexyl; phenyl or phenyl substituted with 1-3 of lower alkyl, halogen, cyano, sulfamoyl, OH, $OR^{13}$, $OXR^{13}$, $SR^{13}$, $XR^{13}$, $NHXR^{13}$,

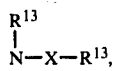

$SO_2NHR^{13}$, $O(CH_2)_nXR^{13}$, $O(CH_2)_nOR^{13}$, where n is 1-6; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; groups of the formula

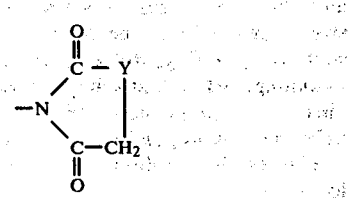

wherein Y is —NH—, —NH—lower alkyl—, —O—, —S—, or —CH$_2$O—; —S—$R^{14}$ wherein $R^{14}$ is lower alkyl, phenyl, phenyl substituted with halogen, lower alkyl, lower alkoxy, lower alkanoylamino, cyano, or lower alkoxycarbonyl; pyridyl, pyrimidinyl, benzoxazolyl, benzimidazolyl, benzothiazolyl, triazolyl, or

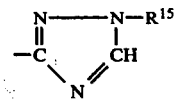

—$SO_2R^{13}$; —$COOR^{13}$; —$OXR^{13}$; —NH—X—$R^{13}$; —X—$R^{13}$; —OCO—$R^{13}$; —$CONR^{15}R^{15}$; —$SO_2NR^{15}R^{15}$; wherein $R^{13}$ and X are as defined above and each $R^{15}$ is selected from H and $R^{13}$; lower alkoxy; lower alkoxy substituted with hydroxy, cyano, lower alkanoyloxy, or lower alkoxy; phenoxy; phenoxy substituted with one or more of lower alkyl, lower alkoxy or halogen; and $R^8$ and $R^9$ can be a single, combined group which, with the nitrogen atom to which each is attached, forms a ring such as pentamethylene, ethyleneoxyethylene and ethylenesulfonylethylene;

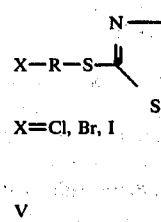

$R^{10}$, $R^{11}$ and $R^{12}$ are each selected from hydrogen and lower alkyl; and $R^{16}$ is selected from hydrogen, lower alkyl, —OH, —Cl, —CONH$_2$, —CONH— lower alkyl, lower alkoxy, phenoxy, —$SR^{14}$, and —$OXR^{13}$ wherein $R^{13}$ and $R^{14}$ are as defined above. The term "lower" as used herein means 1-6 carbons.

The couplers are prepared by procedures well known in the art and such couplers are disclosed in general in the patent literature, e.g., U.S. Pat. Nos. 2,805,218; 2,827,450; and 2,839,523.

The azo moieties are prepared by procedures known to the art as exemplified below.

GENERAL PREPARATIVE METHODS

1. Diazotization and Coupling—The intermediate 2-amino-1,3,4-thiadiazoles III may be prepared by reacting 2-amino-5-mercapto-1,3,4-thiadiazole (I) with appropriate halides II as follows:

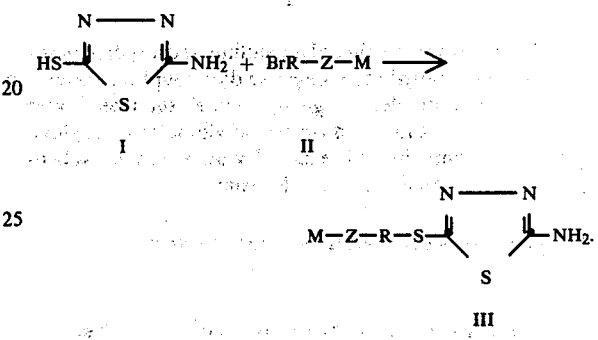

Compounds III are then diazotized and coupled in the normal manner to give dyes IV

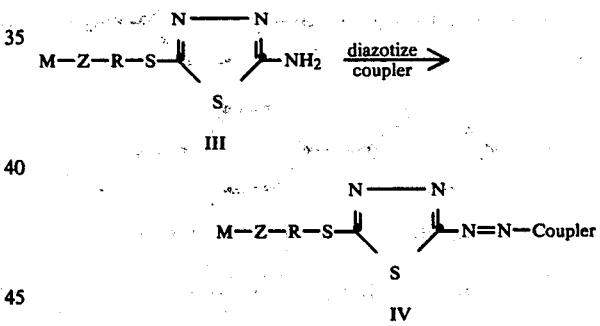

2. Reaction With Sulfite and Thiosulfate Salts—Compounds (V) contaning halogens such as Cl, Br and I can be reacted with sulfites or thiosulfates to give VI and VIII, respectively as follows:

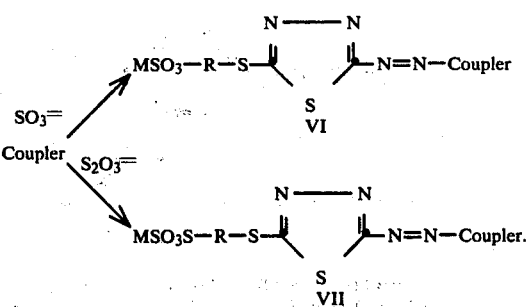

3. Reaction of Hydroxyl Containing Dye With Sulfuric Acid—Sulfate esters (IX) may be prepared by reacting dyes VIII containing one or more hydroxyl groups with sulfuric acid as follows:

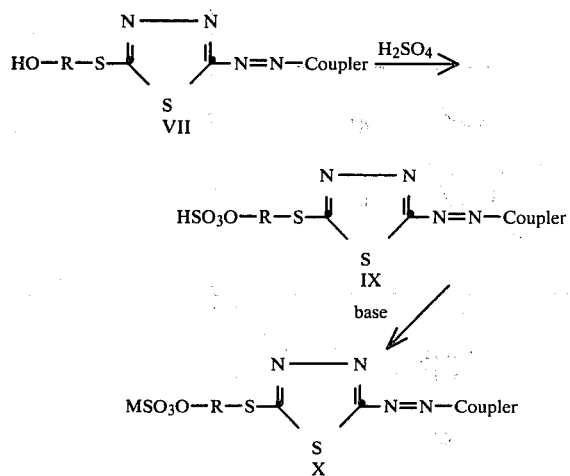

Salts X of the sulfate esters are prepared by neutralizing IX with base, such as alkali metal hydroxides, metal carbonates or ammonium hydroxide as shown above.

4. Direct Sulfonation—When R contains an aromatic ring, with or without a linking group $R_1$, the sulfonic acid derivatives may be prepared by direct sulfonation, either to produce dyes XI directly or intermediate XII may be sulfonated, followed by diazotization and coupling, to give dyes XI as follows:

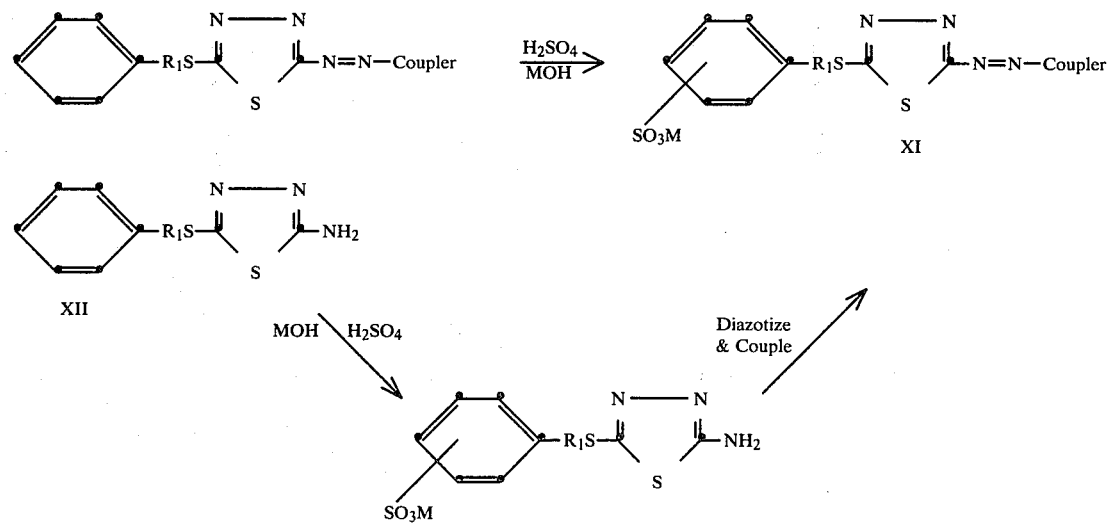

This invention with be further illustrated by the following examples although it will be understood that these examples are included merely for purposes of illustration and are not intended to limit the scope of the invention.

EXAMPLE 1
Preparation of 2-Amino-5-[(2-Sulfoethyl)Thio]-1,3,4-thiadiazole Na Salt 2-Amino-5-mercapto-1,3,4-thiadiazole (13.3 8, 0.10 m), 2-bromoethanesulfonic acid, Na salt (21.1 g, 0.10 m), sodium carbonate (0.11 m), sodium iodide (1 g), and water (100 ml) are heated on a steambath until reaction is complete as determined by thin-layer chromatography, usually within 6 hours. The reaction mixture is cooled and drowned into about 500 ml of acetone. The white precipitate is collected by filtration and dried in air. The product

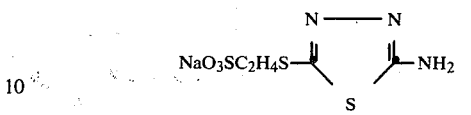

contains some salt but is used without further purification to prepare azo dyes.

EXAMPLE 2
Diazotization and Coupling

To 50 ml of concentrated $H_2SO_4$ is added portionwise with stirring 7.2 g. of dry $NaNO_2$, allowing the temperature to rise. The nitrosyl sulfuric acid is cooled and 100 ml of 2:5 acid (2 parts propionic:5 parts acetic acid) is added below 15° C. At 0°–5° C., 2-amino-5-[(2-sulfoethyl)thio]-1,3,4-thiadiazole, Na salt (26.4 g, 0.10 m) is added, followed by 100 ml of 2:5 acid. The reaction mixture is stirred for 2 hrs. at 0°–5° C. An aliquot (0.01 m) is added to a solution of (0.01 m) of each of the following couplers in 25 ml of 2:5 acid, at 0°–5° C. After allowing to stand for about 30 min., the coupling mixtures are neutralized by adding 50% NaOH solution at less than 25° C.

N-Ethyl-2-methyl-5-acetamidoaniline
N-2-Acetamidoethyl-N-ethyl-m-toluidine
N-2-Carboxamidoethyl-N-ethyl-m-toluidine
N-2-Carboxamidoethyl-2-methoxy-5-methylaniline
N,N-Diethyl-m-acetamidoaniline
N-2-Hydroxyethyl-2,2,4,7-tetramethyl-1,2,3,4-tetrahydroquinoline
N-(2-Hydroxyethyl)-2,3-dihydro-3,6-dimethyl-1,4-benzoxazine
N-Benzyl-N-ethyl-m-acetamidoaniline The coupling mixture was distilled with about 200 ml of water and the dyes were collected by filtration and washed with NaCl solution. Bright orange to bluish red dyes were obtained which had excellent brightness, lightfastness and heat stability.

The following tables give exemplary dyes of the present invention.

TABLE 1

$$M-Z-R-S-\underset{S}{\overset{N-N}{\underset{\|}{C}}}-\underset{\|}{C}-N=N-\underset{R^6}{\overset{R^7}{\bigcirc}}-N\underset{R^9}{\overset{R^8}{\diagdown}}$$

| M | Z | R | R$^6$ | R$^7$ | R$^8$ | R$^9$ |
|---|---|---|---|---|---|---|
| Na | SO$_3$ | C$_2$H$_4$ | H | H | —CH$_2$CH$_3$ | —CH$_2$CH$_2$OCOCH$_3$ |
| Na | SO$_3$ | C$_2$H$_4$ | " | " | " | —CH$_2$CH$_2$CN |
| Na | SO$_3$ | C$_2$H$_4$ | " | " | —CH$_2$CH$_2$OCOCH$_3$ | —CH$_2$CH$_2$OCOCH$_3$ |
| Na | SO$_3$ | C$_2$H$_4$ | " | " | —CH$_2$CH$_2$CN | —CH$_2$CH$_2$OH |
| K | SO$_4$ | C$_2$H$_4$ | " | " | " | —CH$_2$CH$_2$OCOCH$_3$ |
| K | SO$_4$ | C$_2$H$_4$ | NHCOCH$_3$ | CH$_3$ | H | —CH$_2$CH$_3$ |
| K | SO$_4$ | C$_2$H$_4$ | " | " | —CH$_2$CH$_3$ | —CH$_2$CH$_2$OH |
| K | SO$_4$ | C$_2$H$_4$ | " | " | " | —CH$_2$CH$_2$—N(succinimidyl) |
| Na | SSO$_3$ | C$_2$H$_4$ | " | " | —CH$_2$CH$_2$CN | —CH$_2$CH$_2$OCOC$_6$H$_5$ |
| Na | SSO$_3$ | C$_2$H$_4$ | " | " | " | —CH$_2$CH$_2$CH$_2$CH$_3$ |
| Na | SSO$_3$ | C$_2$H$_4$ | " | " | —CH$_2$CH$_3$ | —CH$_2$C$_6$H$_5$ |
| Na | SSO$_3$ | C$_2$H$_4$ | " | " | —C$_6$H$_{11}$ | —CH$_2$CHCH$_2$OH<br>\|<br>OH |
| K | SO$_3$ | —C(CH$_3$)(H)CH$_2$CH$_2$— | " | " | " | —CH$_2$CH$_2$OH |
| Na | SO$_4$ | —CH$_2$CH$_2$CH$_2$— | " | " | " | —CH$_2$CH$_3$ |
| Na | SO$_3$ | —CH$_2$CH(OH)CH$_2$— | " | " | —CH$_2$CH$_3$ | " |
| Na | SO$_3$ | —CH$_2$CH(OH)CH$_2$— | " | " | —CH$_2$CH$_2$OCH$_3$ | —CH$_2$CH$_2$COCH$_3$ |
| Na | SO$_3$ | —CH$_2$CH(OH)CH$_2$— | —CH$_3$ | " | —CH$_2$CH$_2$OH | —CH$_2$CH$_2$OH |
| Na | SO$_3$ | —CH$_2$CH(OH)CH$_2$— | " | " | " | —CH$_2$CH$_3$ |
| K | SO$_3$ | —CH$_2$CH$_2$OCH$_2$CH$_2$— | " | " | —CH$_2$CH$_2$OCOCH$_3$ | —CH$_2$CH$_2$OCOCH$_3$ |
| Na | SO$_3$ | —CH$_2$CH$_2$O—(phenylene)— | " | " | —CH$_2$CH$_3$ | —CH$_2$CHCH$_2$OH<br>\|<br>OH |
| Na | SO$_3$ | —CH$_2$CH$_2$O—(phenylene)— | " | " | " | —CH$_2$CH$_2$CN |
| Na | SO$_3$ | —CH$_2$CH$_2$O—(phenylene)— | " | " | " | —CH$_2$CH$_2$Cl |
| Na | SO$_3$ | —CH$_2$CH$_2$O—(phenylene)— | " | " | —CH$_2$CH$_2$SO$_2$CH$_2$CH$_2$— | |
| Na | SSO$_3$ | —CH$_2$CH$_2$SCH$_2$CH$_2$— | —NHCOCH$_3$ | " | " | —CH$_2$CH$_3$ |

TABLE 1-continued

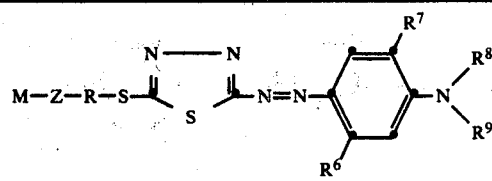

| M | Z | R | R⁶ | R⁷ | R⁸ | R⁹ |
|---|---|---|---|---|---|---|
| K | SO₄ | —CH₂—(S-ring)—CH₂— | " | " | " | —CH₂CH₂CN |
| K | SO₃ | —(phenyl)— | " | " | —CH₂CH₂OCOCH₃ | —CH₂CH₂OCOCH₃ |
| K | SO₃ | —(phenyl)—CH₂— | " | —CH₃ | —H | —CH₂CH₂CN |
| K | SO₃ | —(phenyl)—CH₂— | " | " | " | —CH(CH₃)CH₂CH₃ |
| K | SO₃ | —(phenyl)—CH₂— | H | —OCH₃ | H | —(S-ring) |
| K | SO₃ | —(phenyl)—CH₂— | —CH₃ | H | —CH₂CH₃ | —CH₂CH₂SO₂NH₂ |
| K | SO₃ | —CH₂CH₂NHCOCH₂— | —NHCOCH₃ | " | H | —CH₂—(phenyl) |
| Na | SSO₃ | —CH₂CH₂SO₂NHCH₂CH₂— | " | " | " | —CH₂CH₂OCH₃ |
| K | SO₃ | —CH₂CH(SO₃K)CH₂— | " | " | " | —CH(CH₃)CH₂COOC₂H₅ |
| K | SO₄ | —CH₂CH(CH₂OC₂H₅)— | " | " | " | —CH(CH₃)CH₂CH₂CH(CH₃)₂ |
| Na | SO₃ | —CH₂CH₂NHSO₂CH₂CH₂— | " | " | " | —CH₂CH(OH)CH₂OH |
| Na | SO₃ | —CH₂CH₂OC(O)CH₂— | " | " | " | —CH(CH₃)—CH₂CH₃ |
| K | SO₃ | —CH₂CH(OH)CH₂O—(phenyl)— | H | CH₃ | " | —(S-ring) |
| K | SO₃ | —CH₂—(phenyl)—CH₂— | " | H | " | CH₂CH₂CN |
| K | SO₃ | —CH₂CH₂S—(phenyl)— | " | " | CH₃ | CH₃ |
| Na | SO₃ | —CH₂CH₂NHC(O)CH₂O—(phenyl)— | " | " | CH₂CH₃ | CH₂CH₃ |
| Na | SO₃ | —CH₂CH₂—N(SO₂CH₃)—CH₂CH₂— | " | " | " | CH₂C₆H₅ |
| Na | SO₄ | —CH₂CH(OSO₃Na)CH₂— | " | " | " | C₆H₁₁ |

TABLE 1-continued $$M-Z-R-S-C(=N-N)-S-C(=N-N=)-C_6H_2(R^6)(R^7)-N(R^8)(R^9)$$

| M | Z | R | R⁶ | R⁷ | R⁸ | R⁹ |
|---|---|---|---|---|---|---|
| Na | SSO₃ | —CH₂CH(SSO₃Na)CH₂— | " | " | " | CH₂CH₂OH |
| Na | SO₃ | C₂H₄ | " | " | " | CH₂CH₂OCOCH₃ |
| K | SO₄ | C₂H₄ | " | " | " | CH₂CH(OH)CH₂OH |
| Na | SSO₃ | C₂H₄ | " | " | " | CH₂CH₂CN |
| K | SO₃ | —C(CH₃)(H)CH₂CH₂— | " | " | CH₂CH₃CN | " |
| Na | SO₄ | —CH₂CH₂CH₂— | " | " | " | CH₂CH₂OH |
| Na | SO₃ | —CH₂CH(OH)CH₂— | " | " | " | CH₂CH₂OCOCH₃ |
| K | SO₃ | —CH₂CH₂OCH₂CH₂— | " | " | " | CH₂CH₂OCOC₆H₅ |
| Na | SO₃ | —CH₂CH₂O—C₆H₄— | " | " | CH₂CH₂OH | CH₂CH₂OH |
| Na | SSO₃ | —CH₂CH₂SCH₂CH₂— | " | " | CH₂CH₂OCOCH₃ | CH₂CH₂OCOCH₃ |
| K | SO₄ | —CH₂—(C₄H₄S)—CH₂— | " | " | —C₂CH₂SO₂CH₂CH₂— | |
| K | SO₃ | —C₆H₄— | Cl | Cl | H | CH₂CH₂CN |
| K | SO₃ | —C₆H₄—CH₂— | CH₃ | H | CH₂CH₃ | CH₂CH(OCCH₃=O)—CH₂OCCH₃(=O) |
| K | SO₃ | —CH₂CH₂NHCOCH₂— | " | " | " | CH₂CH₃ |
| Na | SSO₃ | —CH₂CH₂SO₂NHCH₂CH₂— | " | " | " | CH₂CH₂OH |
| K | SO₃ | —CH₂CH(SO₃K)CH₂— | " | " | " | CH₂CH₂NHCOOC₂H₅ |
| K | SO₄ | —CH₂CH(OC₂H₅)CH₂— | " | " | " | " |
| Na | SO₃ | —CH₂CH₂NHSO₂CH₂CH₂— | " | " | CH₂CH₂CN | " |
| Na | SO₃ | —CH₂CH₂OC(=O)CH₂— | NHCOCH₃ | " | CH₂CH₃ | CH₂CH₃ |
| K | SO₃ | —CH₂CH(OH)CH₂O—C₆H₄— | " | " | " | CH₂CH₂OCOCH₃ |
| K | SO₃ | —CH₂—C₆H₄—CH₂— | " | " | " | (CH₂CH₂O)₂CH₂CH₃ |
| K | SO₃ | —CH₂CH₂S—C₆H₄— | NHCOC₆H₅ | " | " | CH₂CH₂CONH₂ |
| Na | SO₃ | —CH₂CH₂NHC(=O)CH₂O—C₆H₄— | " | CH₃ | H | CH₂CH₃ |

TABLE 1-continued $$M-Z-R-S-C(=N-N)-C(S)-N=N-\text{Ar}(R^6, R^7)-N(R^8)(R^9)$$

(Structure: M—Z—R—S—[1,3,4-thiadiazole]—N=N—phenyl(R⁶,R⁷)—N(R⁸)(R⁹))

| M | Z | R | R⁶ | R⁷ | R⁸ | R⁹ |
|---|---|---|----|----|----|----|
| Na | SO₃ | —CH₂CH₂—N(SO₂CH₃)—CH₂CH₂— | NHCOCH₃ | OCH₃ | CH₂CH₃ | " |
| Na | SO₄ | —CH₂CH(OSO₃Na)CH₂— | " | " | " | CH₂CH₃OCOCH₃ |
| Na | SSO₃ | —CH₂CH(SSO₃Na)CH₂— | " | " | " | CH₂CH(OH)CH₃ |
| Na | SO₃ | C₂H₄ | " | " | CH₂CH₂OH | CH₂CH₂OH |
| K | SO₄ | C₂H₄ | " | " | CH₂CH₂OCOCH₃ | CH₂CH₂OCOCH₃ |
| Na | SSO₃ | —C₂H₄— | " | " | CH₂CH₃ | thienyl |
| K | SO₃ | —CH(CH₃)CH₂CH₂— | " | H | " | CH₂CH₂OCONH—C₆H₅ |
| Na | SO₄ | —CH₂CH₂CH₂— | " | " | " | CH₂CH₂S—C(=N-phenyl)—S-phenyl (benzothiazoline) |
| H | " | —CH₂CH₂— | " | CH₃ | H | CH₂—C₆H₄—OCH₂—C₆H₅ |
| " | " | " | " | " | " | CH₂—C₆H₄—OCOCH₃ |
| " | " | " | " | " | " | CH₂—C₆H₄—OCONH—C₆H₅ |
| Na | SO₃ | " | " | " | " | CH₂—C₆H₄—OC₂H₄OH |
| H | " | " | " | " | " | CH₂—C₆H₄—SC₄H₉—n |
| Na | " | " | " | " | " | CH₂—C₆H₄—OC₂H₄OCOCH₃ |
| " | " | " | " | " | " | CH₂—C₆H₄—COOC₆H₅ |
| " | " | " | " | " | " | CH₂—C₆H₄—COOC₆H₁₁ |
| " | " | " | " | " | " | CH₂—C₆H₄—SO₂N(C₂H₅)₂ |
| " | " | " | " | " | " | CH₂—C₆H₄—OC₆H₅ |

TABLE 1-continued

Structure: M—Z—R—S—C(=N-N=)(S)—C=N—N=Ar, where Ar is a benzene ring with substituents $R^6$, $R^7$, and $N(R^8)(R^9)$

| M | Z | R | $R^6$ | $R^7$ | $R^8$ | $R^9$ |
|---|---|---|-------|-------|-------|-------|
| " | " | " | " | " | " | $-CH_2-C_6H_4-OC_6H_{11}$ |
| " | " | " | " | " | " | $-CH_2CH_2-C_6H_4-NHCOC_2H_5$ |
| " | " | " | " | " | " | $-CH_2CH_2CH_2-C_6H_4-OCOC_6H_5$ |
| " | " | " | " | " | " | $-CH_2-C_6H_4-OCONHC_2H_5$ |
| " | " | " | " | " | " | $-CH_2-C_6H_4-CNHC_4H_9\text{-}n$ (C=O) |
| " | " | " | " | " | " | $-CH_2-C_6H_4-C(=O)N(C_2H_5)_2$ |
| " | " | " | " | " | " | $-CH_2-C_6H_4-C(=O)NH-C_6H_5$ |
| " | " | " | " | " | " | $-CH_2-C_6H_4-COC_2H_4OCH_3$ (ester) |

TABLE II

Structure: M—Z—R—S—C(thiadiazole)—N=N—Ar, where Ar is a tetrahydroquinoline with substituents $R^6$, $R^{10}$, $R^{11}$, $R^{12}$, $R^{16}$ on ring carbons and $R^8$ on N.

| M | Z | R | $R^6, R^{10}, R^{11}, R^{12}, R^{16}$ | $R^8$ |
|---|---|---|---------------------------------------|-------|
| Na | $SO_3$ | $C_2H_4$ | 2,7-di-$CH_3$ | $-C_2H_4OH$ |
| Na | $SO_3$ | $C_2H_4$ | 2,5-di-$CH_3$—8-$OCH_3$ | $-CH_2CH(OH)CH_2OH$ |
| Na | $SO_3$ | $C_2H_4$ | 2,2,4,7-tetra-$CH_3$ | $-C_2H_4CONH_2$ |
| Na | $SO_3$ | $C_2H_4$ | 2,2,4-tri-$CH_3$ | $-C_2H_4NHCOCH_3$ |
| K | $SO_4$ | $C_2H_4$ | 2-$CH_3$—7-$NHCOCH_3$ | $-C_2H_4CN$ |
| K | $SO_4$ | $C_2H_4$ | 2,2,4-tri-$CH_3$—7-$NHCOCH_3$ | $-C_2H_4Cl$ |
| K | $SO_4$ | $C_2H_4$ | 2-$CH(CH_3)_2$—7-$NHCOCH_3$ | $-C_2H_4OOCH_3$ |
| K | $SO_4$ | $C_2H_4$ | 7-$CH_3$ | $-C_2H_4OC_2H_5$ |
| Na | $SSO_3$ | $C_2H_4$ | 3-CN—7-$CH_3$ | $-C_2H_4CONHC_2H_5$ |
| Na | $SSO_3$ | $C_2H_4$ | 3-$CONH_2$—7-$CH_3$ | $-C_2H_4CON(C_2H_5)_2$ |
| Na | $SSO_3$ | $C_2H_4$ | 3-Cl—7-$CH_3$ | $-C_2H_4CONHCH_2C_6H_5$ |
| Na | $SSO_3$ | $C_2H_4$ | 3-$OCH_3$—7-$CH_3$ | $-C_2H_4OOCOC_2H_5$ |
| K | $SO_3$ | $-C(CH_3)(H)CH_2CH_2-$ | 2,2,4-tri-$CH_3$—5,8-di-$OCH_3$ | $-C_2H_4NHCOCH=CH_2$ |

TABLE II-continued

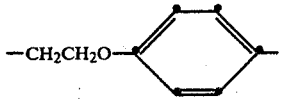

| M | Z | R | R⁶, R¹⁰, R¹¹, R¹², R¹⁶ | R⁸ |
|---|---|---|---|---|
| Na | SO₄ | —CH₂CH₂CH₂— | 2,2,4-tri-CH₃—8-OCH₃ | —CH₂C₆H₅ |
| Na | SO₃ | —CH₂CHCH₂—<br>\|<br>OH | 2-CH₃—7-NHCOCH₃ | —C₂H₄CONHCH₂OH |
| Na | SO₃ | —CH₂CHCH₂—<br>\|<br>OH | 3-OH—7-CH₃ | —C₃H₆NHCONHC₂H₅ |
| Na | SO₃ | —CH₂CHCH₂—<br>\|<br>OH | 2,7-di-CH₃ | —C₂H₅ |
| Na | SO₃ | —CH₂CHCH₂—<br>\|<br>OH | 2,5-di-CH₃—8-OCH₃ | —C₂H₄SO₂NH₂ |
| K | SO₃ | —CH₂CH₂OCH₂CH₂— | 2,2,4,7-tetra-CH₃ | —C₂H₄SO₂NHC₂H₅ |
| Na | SO₃ | 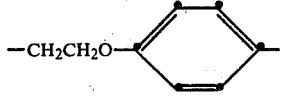 | 2,2,4-tri-CH₃ | —C₂H₄SCH₃ |
| Na | SO₃ | 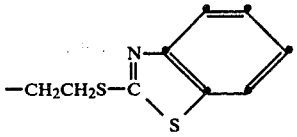 | 2-CH₃—7-NHCOCH₃ | 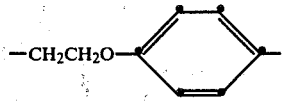 |
| Na | SO₃ | 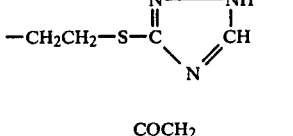 | 2,2,4-tri-CH₃—7-NHCOCH₃ | 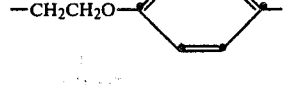 |
| Na | SO₃ | 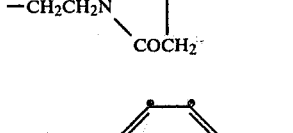 | 2,-CH(CH₃)₂—7-NHCOCH₃ | 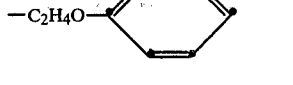 |
| Na | SSO₃ | —CH₂CH₂SCH₂CH₂— | 7-CH₃ | 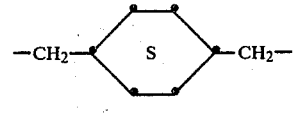 |
| K | SO₄ | 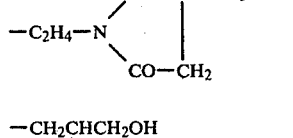 | 3-CN—7-CH₃ |  |
| K | SO₃ |  | 3-CONH₂—7-CH₃ | —CH₂CHCH₂OH<br>\|<br>OH |

TABLE II-continued $$M-Z-R-S-\underset{S}{\overset{N-N}{\underset{|}{C}}}-C-N=N-\text{Ar}(R^6)(R^{12},R^{16},R^{11},R^{10},NR^8)$$

| M | Z | R | $R^6, R^{10}, R^{11}, R^{12}, R^{16}$ | $R^8$ |
|---|---|---|---|---|
| K | $SO_3$ | $C_6H_5-CH_2-$ | 3-Cl—7-$CH_3$ | $-C_2H_4-N(CO-O)(CO-CH_2)$ |
| K | $SO_3$ | $C_6H_5-CH_2-$ | 3-$OCH_3$—7-$CH_3$ | $-C_2H_4-N(CO-CH_2)(CO-CH_2)$ |
| K | $SO_3$ | $C_6H_5-CH_2-$ | 2,2,4-tri-$CH_3$—5,8-di-$OCH_3$ | $-C_2H_4-N(COCH_2)(COCH_2)CH_2$ |
| K | $SO_3$ | $C_6H_5-CH_2-$ | 2,2,4-tri-$CH_3$—8-$OCH_3$ | $-C_2H_4-N(CO)(CO)C_6H_4$ |
| K | $SO_3$ | $-CH_2CH_2NHCOCH_2-$ | 2-$CH_3$—7-$NHCOCH_3$ | $-C_2H_4-N(CO-NH)(CO-CH_2)$ |
| Na | $SSO_3$ | $-CH_2CH_2SO_2NHCH_2CH_2-$ | 3-OH—7-$CH_3$ | $-C_2H_4-N(COCH_2)(COCH_2)O$ |
| K | $SO_3$ | $-CH_2CH(SO_3K)CH_2-$ | 2,7-di-$CH_3$ | $-C_2H_4-N(CO-C_6H_4-SO_2)$ |
| K | $SO_4$ | $-CH_2CH(OC_2H_5)CH_2-$ | 2,5-di-$CH_3$—8-$OCH_3$ | $-C_2H_4-N(CO-S)(CO-CH_2)$ |
| Na | $SO_3$ | $-CH_2CH_2NHSO_2CH_2CH_2-$ | 2,2,4,7-tetra-$CH_3$ | $-C_2H_4-S-C(=N-CH=N-)N-C_2H_4CN$ |
| Na | $SO_3$ | $-CH_2CH_2OCOCH_2-$ | 2,2,4-tri-$CH_3$ | $-C_2H_4-N(CO-CH_2)(CH_2-CH_2)$ |
| K | $SO_3$ | $-CH_2CH(OH)CH_2O-C_6H_4-$ | 2-$CH_3$—7-$NHCOCH_3$ | $-C_2H_4NHCO-C_6H_5$ |

TABLE II-continued

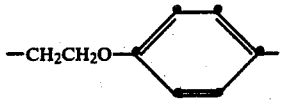

| M | Z | R | R⁶, R¹⁰, R¹¹, R¹², R¹⁶ | R⁸ |
|---|---|---|---|---|
| Na | SO₄ | —CH₂CH₂CH₂— | 2,2,4-tri-CH₃—8-OCH₃ | —CH₂C₆H₅ |
| Na | SO₃ | —CH₂CH(OH)CH₂— | 2-CH₃—7-NHCOCH₃ | —C₂H₄CONHCH₂OH |
| Na | SO₃ | —CH₂CH(OH)CH₂— | 3-OH—7-CH₃ | —C₃H₆NHCONHC₂H₅ |
| Na | SO₃ | —CH₂CH(OH)CH₂— | 2,7-di-CH₃ | —C₂H₅ |
| Na | SO₃ | —CH₂CH(OH)CH₂— | 2,5-di-CH₃—8-OCH₃ | —C₂H₄SO₂NH₂ |
| K | SO₃ | —CH₂CH₂OCH₂CH₂— | 2,2,4,7-tetra-CH₃ | —C₂H₄SO₂NHC₂H₅ |
| Na | SO₃ | —CH₂CH₂O—C₆H₄— | 2,2,4-tri-CH₃ | —C₂H₄SCH₃ |
| Na | SO₃ | —CH₂CH₂O—C₆H₄— | 2-CH₃—7-NHCOCH₃ | 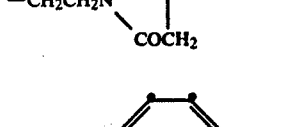 |
| Na | SO₃ | —CH₂CH₂O—C₆H₄— | 2,2,4-tri-CH₃—7-NHCOCH₃ |  |
| Na | SO₃ | —CH₂CH₂O—C₆H₄— | 2,-CH(CH₃)₂—7-NHCOCH₃ | 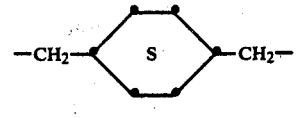 |
| Na | SSO₃ | —CH₂CH₂SCH₂CH₂— | 7-CH₃ | 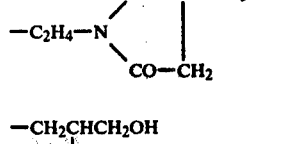 |
| K | SO₄ | 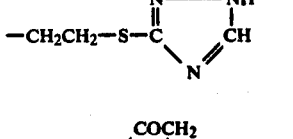 | 3-CN—7-CH₃ |  |
| K | SO₃ | 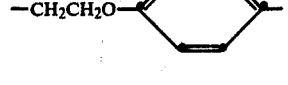 | 3-CONH₂—7-CH₃ | —CH₂CH(OH)CH₂OH |

TABLE II-continued

Structure:

$$M-Z-R-S-C(=N-N=)\text{-[thiadiazole ring with S]-}C-N=N-\text{[aryl with }R^6\text{]-}CR^{12}R^{16}-CR^{10}R^{11}-N(R^8)$$

| M | Z | R | $R^6, R^{10}, R^{11}, R^{12}, R^{16}$ | $R^8$ |
|---|---|---|---|---|
| K | $SO_3$ | –C₆H₅–CH₂– (benzyl) | 3-Cl—7-CH₃ | –C₂H₄–N(CO–O)(CO–CH₂)– |
| K | $SO_3$ | –C₆H₅–CH₂– (benzyl) | 3-OCH₃—7-CH₃ | –C₂H₄–N(CO–CH₂)(CO–CH₂)– |
| K | $SO_3$ | –C₆H₅–CH₂– (benzyl) | 2,2,4-tri-CH₃—5,8-di-OCH₃ | –C₂H₄–N(COCH₂)(COCH₂)(CH₂)– |
| K | $SO_3$ | –C₆H₅–CH₂– (benzyl) | 2,2,4-tri-CH₃—8-OCH₃ | –C₂H₄–N(CO)(CO)–C₆H₄– |
| K | $SO_3$ | –CH₂CH₂NHCOCH₂– | 2-CH₃—7-NHCOCH₃ | –C₂H₄–N(CO–NH)(CO–CH₂)– |
| Na | $SSO_3$ | –CH₂CH₂SO₂NHCH₂CH₂– | 3-OH—7-CH₃ | –C₂H₄–N(COCH₂)(COCH₂)–O– |
| K | $SO_3$ | –CH₂CH(SO₃K)CH₂– | 2,7-di-CH₃ | –C₂H₄–N–(C(=O)–C₆H₄–SO₂)– |
| K | $SO_4$ | –CH₂CH(CH₂OC₂H₅)– | 2,5-di-CH₃—8-OCH₃ | –C₂H₄–N(CO–S)(CO–CH₂)– |
| Na | $SO_3$ | –CH₂CH₂NHSO₂CH₂CH₂– | 2,2,4,7-tetra-CH₃ | –C₂H₄–S–C(=N–NC₂H₄CN)(N=CH)– |
| Na | $SO_3$ | –CH₂CH₂OC(=O)CH₂– | 2,2,4-tri-CH₃ | –C₂H₄–N(CO–CH₂)(CH₂–CH₂)– |
| K | $SO_3$ | –CH₂CH(OH)CH₂O–C₆H₅– | 2-CH₃—7-NHCOCH₃ | –C₂H₄NHC(=O)–C₆H₅ |

TABLE II-continued

M—Z—R—S—C(=N-N=)—S—C—N=N—[aryl with R⁶, R¹⁰, R¹¹, R¹², R¹⁶, N-R⁸ substituents]

| M | Z | R | R⁶, R¹⁰, R¹¹, R¹², R¹⁶ | R⁸ |
|---|---|---|---|---|
| K | SO₃ | —CH₂—C₆H₄—CH₂— | 2,2,4-tri-CH₃—7-NHCOCH₃ | —C₂H₄NHCO—C₆H₄—OCH₃ |
| K | SO₃ | —CH₂CH₂S—C₆H₄— | 2-CH(CH₃)₂—7-NHCOCH₃ | —CH₂CH₂—S—(1,2,4-triazole) |
| Na | SO₃ | —CH₂CH₂NHCOCH₂O—C₆H₄— | 7-CH₃ | —CH₂CH₂—N(phthalimide-like, CO/CH₂) |
| Na | SO₃ | —CH₂CH₂—N(SO₂CH₃)—CH₂CH₂— | 3-CN—7-CH₃ | —C₂H₄OH |
| Na | SO₄ | —CH₂CH(OSO₃Na)CH₂— | 3-CONH₂—7-CH₃ | —CH₂CH₂—N(CO-CH=CH-SO₂) (cyclic) |
| Na | SSO₃ | —CH₂CH(SSO₃Na)CH₂— | 2,2,4,7-tetra-CH₃ | —CH₂CH₂OCNH—C₆H₅ |
| Na | SO₃ | C₂H₄ | 2,2,4,7-tetra-CH₃ | —CH₂CH₂N(phthalimido) |

TABLE III

M—Z—R—S—C(=N-N=)—S—C—N=N—[aryl with R⁶, R¹⁰, N-R⁸, O]

| M | Z | R | R⁶, R¹⁰ | R⁸ |
|---|---|---|---|---|
| Na | SO₃ | C₂H₄ | 3,6-di-CH₃ | —C₂H₄OH |
| Na | SO₃ | C₂H₄ | 3-CH₃ | —CH₂CH(OH)CH₂OH |
| Na | SO₃ | C₂H₄ | 3-CH₃—6-NHCOCH₃ | —C₂H₄CONH₂ |
| Na | SO₃ | C₂H₄ | 6-NHCOCH₃ | —C₂H₄NHCOCH₃ |
| K | SO₄ | C₂H₄ | 3,6-di-CH₃ | —C₂H₄CN |

TABLE III-continued

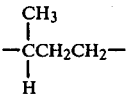

| M | Z | R | R⁶, R¹⁰ | R⁸ |
|---|---|---|---|---|
| K | SO₄ | C₂H₄ | 3-CH₃ | —C₂H₄Cl |
| K | SO₄ | C₂H₄ | 3-CH₃—6-NHCOCH₃ | —C₂H₄OOCC₂H₅ |
| K | SO₄ | C₂H₄ | 6-NHCOCH₃ | —C₂H₄OC₂H₅ |
| Na | SSO₃ | C₂H₄ | 3,6-di-CH₃ | —C₂H₄CONHC₂H₅ |
| Na | SSO₃ | C₂H₄ | 3-CH₃ | —C₂H₄CON(C₂H₅)₂ |
| Na | SSO₃ | C₂H₄ | 3-CH₃—6-NHCOCH₃ | —C₂H₄CONHCH₂C₆H₅ |
| Na | SSO₃ | C₂H₄ | 6-NHCOCH₃ | —C₂H₄OOCOC₂H₅ |
| K | SO₃ | —C(CH₃)(H)CH₂CH₂— | 3,6-di-CH₃ | —C₂H₄NHCOCH=CH₂ |
| Na | SO₄ | —CH₂CH₂CH₂— | 3-CH₃ | —CH₂C₆H₅ |
| Na | SO₃ | —CH₂CH(OH)CH₂— | 3-CH₃—6-NHCOCH₃ | —C₂H₄CONHCH₂OH |
| Na | SO₃ | —CH₂CH(OH)CH₂— | 6-NHCOCH₃ | —C₃H₆NHCONHC₂H₅ |
| Na | SO₃ | —CH₂CH(OH)CH₂— | 3,6-di-CH₃ | —C₂H₅ |
| Na | SO₃ | —CH₂CH(OH)CH₂— | 3-CH₃ | —C₂H₄SO₂NH₂ |
| K | SO₃ | —CH₂CH₂OCH₂CH₂— | 3-CH₃—6-NHCOCH₃ | —C₂H₄SO₂NHC₂H₅ |
| Na | SO₃ | —CH₂CH₂O—C₆H₄— | 6-NHCOCH₃ | —C₂H₄SCH₃ |
| Na | SO₃ | —CH₂CH₂O—C₆H₄— | 3,6-di-CH₃ | 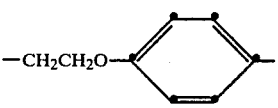 |
| Na | SO₃ | —CH₂CH₂O—C₆H₄— | 3-CH₃ | 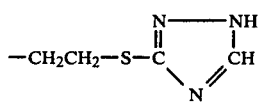 |
| Na | SO₃ | —CH₂CH₂O—C₆H₄— | 3-CH₃—6-NHCOCH₃ | 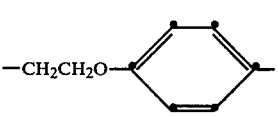 |
| Na | SSO₃ | —CH₂CH₂SCH₂CH₂— | 6-NHCOCH₃ | —C₂H₄O—C₆H₅ |

TABLE III-continued $$M-Z-R-S-C(=N-N=)-S-C(=N-N=)-\text{Ar}(R^6)(N(R^8)(COR^{10}))$$

| M | Z | R | R⁶, R¹⁰ | R⁸ |
|---|---|---|---------|-----|
| K | SO₄ | −CH₂−(1,4-dithiane)−CH₂− | 3,6-di-CH₃ | −C₂H₄−N(CO−N(CH₃)−CO−CH₂) |
| K | SO₃ | −CH₂−C₆H₄−CH₂− (p-xylylene) | 3-CH₃ | −CH₂CH(OH)CH₂OH |
| K | SO₃ | −C₆H₄−CH₂− | 3-CH₃−6-NHCOCH₃ | −C₂H₄−N(CO−O / CO−CH₂) |
| K | SO₃ | −C₆H₄−CH₂− | 6-NHCOCH₃ | −C₂H₄−N(CO−CH₂ / CO−CH₂) |
| K | SO₃ | −C₆H₄−CH₂− | 3,6-di-CH₃ | −C₂H₄−N(COCH₂ / COCH₂)CH₂ |
| K | SO₃ | −C₆H₄−CH₂− | 3-CH₃ | −C₂H₄−N(CO / CO)C₆H₄ |
| K | SO₃ | −CH₂CH₂NHCOCH₂− | 3-CH₃−6-NHCOCH₃ | −C₂H₄−N(CO−NH / CO−CH₂) |
| Na | SSO₃ | −CH₂CH₂SO₂NHCH₂CH₂− | 6-NHCOCH₃ | −C₂H₄−N(COCH₂−O−COCH₂) |
| K | SO₃ | −CH₂CH(SO₃K)CH₂− | 3,6-di-CH₃ | −C₂H₄−N(C / SO₂)C₆H₄ |
| K | SO₄ | −CH₂CH(OC₂H₅)CH₂− | 3-CH₃ | −C₂H₄−N(CO−S / CO−CH₂) |
| Na | SO₃ | −CH₂CH₂NHSO₂CH₂CH₂− | 3-CH₃−6-NHCOCH₃ | −C₂H₄−S−C(=N−N(NC₂H₄CN)−CH=N) |

TABLE III-continued $$M-Z-R-S-\underset{S}{\overset{N-N}{C}}-\overset{N-N}{C}-N=N-\underset{R^6}{\overset{}{\bigcirc}}-\underset{\underset{R^8}{\overset{|}{N}}}{\overset{O}{\underset{\parallel}{C}}}R^{10}$$

| M | Z | R | R⁶, R¹⁰ | R⁸ |
|---|---|---|---|---|
| Na | SO₃ | —CH₂CH₂OC(O)CH₂— | 6-NHCOCH₃ | —C₂H₄—N(CO—CH₂)(CH₂—CH₂) (succinimide) |
| K | SO₃ | —CH₂CH(OH)CH₂O—⟨phenyl⟩— | 3,6-di-CH₃ | —C₂H₄NHC(O)—⟨phenyl⟩ |
| K | SO₃ | —CH₂—⟨phenyl⟩—CH₂— | 3-CH₃ | —C₂H₄NHC(O)—⟨phenyl⟩—OCH₃ |
| K | SO₃ | —CH₂CH₂S—⟨phenyl⟩— | 3-CH₃—6-NHCOCH₃ | —CH₂CH₂—S—C(=N—NH—CH=N) (thiadiazole) |
| Na | SO₃ | —CH₂CH₂NHC(O)CH₂O—⟨phenyl⟩— | 6-NHCOCH₃ | —CH₂CH₂—N(isoindolinone) |
| Na | SO₃ | —CH₂CH₂—N(SO₂CH₃)—CH₂CH₂— | 3,6-di-CH₃ | —C₂H₄OH |
| Na | SO₄ | —CH₂CH(OSO₃Na)CH₂— | 3-CH₃ | —CH₂CH₂—N(benzisothiazolinone dioxide) |
| Na | SSO₃ | —CH₂CH(SSO₃Na)CH₂— | 3,6-di-CH₃ | —CH₂CH₂OC(O)NH—⟨phenyl⟩ |
| Na | SO₃ | —C₂H₄— | 3,6-di-CH₃ | —CH₂CH₂N(phthalimide) |

The invention has been described in detail with particular reference to preferred embodiments thereof, but it will be understood that variations and modifications can be effected within the spirit and scope of the inventon.

We claim:
1. A compound having the formula

TABLE III-continued $$M-Z-R-S-\underset{S}{\overset{N-N}{\underset{\|}{C}}}=N-\underset{R^6}{\overset{}{\bigcirc}}-\underset{\underset{R^8}{N}}{\overset{O}{\underset{\|}{\bigcirc}}}R^{10}$$

| M | Z | R | $R^6, R^{10}$ | $R^8$ |
|---|---|---|---|---|
| K | SO$_4$ | —CH$_2$—⟨S⟩—CH$_2$— | 3,6-di-CH$_3$ | —C$_2$H$_4$—N(CO—N(CH$_3$))(CO—CH$_2$) |
| K | SO$_3$ | —⟨C$_6$H$_4$⟩— | 3-CH$_3$ | —CH$_2$CH(OH)CH$_2$OH |
| K | SO$_3$ | —⟨C$_6$H$_4$⟩—CH$_2$— | 3-CH$_3$—6-NHCOCH$_3$ | —C$_2$H$_4$—N(CO—O)(CO—CH$_2$) |
| K | SO$_3$ | —⟨C$_6$H$_4$⟩—CH$_2$— | 6-NHCOCH$_3$ | —C$_2$H$_4$—N(CO—CH$_2$)(CO—CH$_2$) |
| K | SO$_3$ | —⟨C$_6$H$_4$⟩—CH$_2$— | 3,6-di-CH$_3$ | —C$_2$H$_4$—N(COCH$_2$)(COCH$_2$)CH$_2$ |
| K | SO$_3$ | —⟨C$_6$H$_4$⟩—CH$_2$— | 3-CH$_3$ | —C$_2$H$_4$—N(CO)(CO)C$_6$H$_4$ |
| K | SO$_3$ | —CH$_2$CH$_2$NHCOCH$_2$— | 3-CH$_3$—6-NHCOCH$_3$ | —C$_2$H$_4$—N(CO—NH)(CO—CH$_2$) |
| Na | SSO$_3$ | —CH$_2$CH$_2$SO$_2$NHCH$_2$CH$_2$— | 6-NHCOCH$_3$ | —C$_2$H$_4$—N(COCH$_2$)(COCH$_2$)O |
| K | SO$_3$ | —CH$_2$CH(SO$_3$K)CH$_2$— | 3,6-di-CH$_3$ | —C$_2$H$_4$—N(C)(SO$_2$)C$_6$H$_4$ |
| K | SO$_4$ | —CH$_2$CH(CH$_2$OC$_2$H$_5$)— | 3-CH$_3$ | —C$_2$H$_4$—N(CO—S)(CO—CH$_2$) |
| Na | SO$_3$ | —CH$_2$CH$_2$NHSO$_2$CH$_2$CH$_2$— | 3-CH$_3$—6-NHCOCH$_3$ | —C$_2$H$_4$—S—C(N—NC$_2$H$_4$CN)(N)CH |

TABLE III-continued $$M-Z-R-S-\underset{S}{\overset{N=N}{C}}\underset{}{\overset{}{C}}-N=N-\underset{R^6}{\overset{}{\bigcirc}}\underset{\underset{R^8}{N}}{\overset{O}{\underset{}{\bigcirc}}}R^{10}$$

| M | Z | R | R⁶, R¹⁰ | R⁸ |
|---|---|---|---|---|
| Na | SO₃ | —CH₂CH₂OC(O)CH₂— | 6-NHCOCH₃ | —C₂H₄—N(CO—CH₂)(CH₂—CH₂) |
| K | SO₃ | —CH₂CH(OH)CH₂O—⟨phenyl⟩ | 3,6-di-CH₃ | —C₂H₄NHC(O)—⟨phenyl⟩ |
| K | SO₃ | —CH₂—⟨phenyl⟩—CH₂— | 3-CH₃ | —C₂H₄NHC(O)—⟨phenyl⟩—OCH₃ |
| K | SO₃ | —CH₂CH₂S—⟨phenyl⟩ | 3-CH₃—6-NHCOCH₃ | —CH₂CH₂—S—C(=N—NH)—CH=N (triazole) |
| Na | SO₃ | —CH₂CH₂NHC(O)CH₂O—⟨phenyl⟩ | 6-NHCOCH₃ | —CH₂CH₂—N(CO)(CH₂)⟨phenyl⟩ (isoindolinone) |
| Na | SO₃ | —CH₂CH₂—N(SO₂CH₃)—CH₂CH₂— | 3,6-di-CH₃ | —C₂H₄OH |
| Na | SO₄ | —CH₂CH(OSO₃Na)CH₂— | 3-CH₃ | —CH₂CH₂—N(CO)(SO₂)⟨phenyl⟩ (saccharin-like) |
| Na | SSO₃ | —CH₂CH(SSO₃Na)CH₂— | 3,6-di-CH₃ | —CH₂CH₂OC(O)NH—⟨phenyl⟩ |
| Na | SO₃ | —C₂H₄— | 3,6-di-CH₃ | —CH₂CH₂N(phthalimide) |

The invention has been described in detail with particular reference to preferred embodiments thereof, but it will be understood that variations and modifications can be effected within the spirit and scope of the invention.

We claim:

1. A compound having the formula

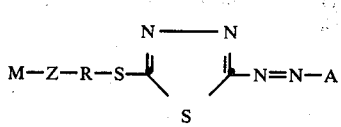

in which R is

—C$_2$H$_4$—, —CH(CH$_3$)CH$_2$CH$_2$—, —CH$_2$CH(OH)CH$_2$—,

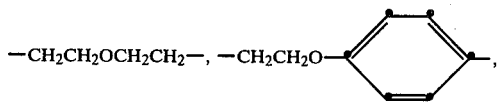

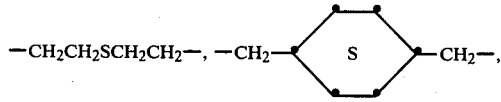

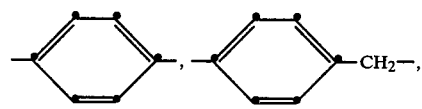

—CH$_2$CH$_2$NHCOCH$_2$—, —CH$_2$CH$_2$SO$_2$NHCH$_2$CH$_2$—,

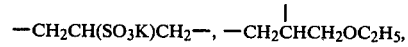

—CH$_2$CH$_2$NHSO$_2$CH$_2$CH$_2$—, —CH$_2$CH$_2$OCOCH$_2$—,

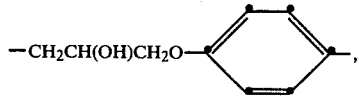

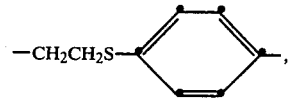

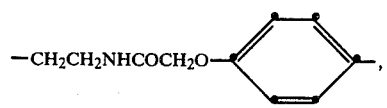

—CH$_2$CH$_2$—N(SO$_2$CH$_3$)—CH$_2$CH$_2$—,

—CH$_2$CH(OSO$_3$Na)CH$_2$—, or —CH$_2$CH(SSO$_3$Na)CH$_2$—;

Z is SO$_3$, SO$_4$, or SSO$_3$; M is hydrogen, an alkali metal or ammonium; and A is selected from coupler moieties of the formulae

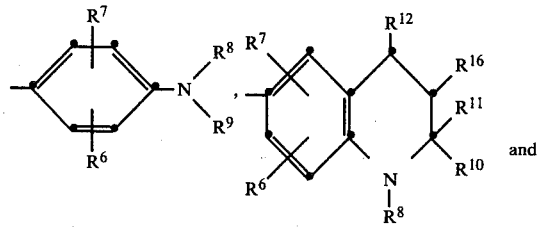 and

-continued

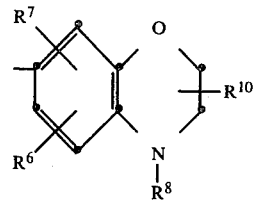

wherein

R$^6$ and R$^7$ are each selected from hydrogen, fluorine, chlorine, bromine, lower alkyl, cycloalkyl, lower alkoxy, phenoxy, lower alkylthio, arylthio, and —NH—X—R$^{13}$ in which X is —CO—, —COO—, or —SO$_2$— and R$^{13}$ is selected from aryl, cycloalkyl, lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is —CO—, R$^{13}$ is also selected from hydrogen, amino, lower alkylamino, lower alkylcarbamoyl, lower dialkylamino, arylamino, and furyl;

R$^8$ and R$^9$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lowr alkoxy, halogen, lower alkanoylamino, cyano or lower alkoxycarbonyl; straight or branched lower alkenyl; straight or branched alkyl or 1–8 carbons and such alkyl substituted with the following: hydroxy; halogen; cyano; succinimido; glutarimido; phthalimidino; 2-pyrrolidono; cyclohexyl; phenyl or phenyl substituted with 1–3 of lower alkyl, halogen, cyano, sulfamoyl, OH, OR$^{13}$, OXR$^{13}$, SR$^{13}$, NHXR$^{13}$, SO$_2$NHR$^{13}$, O(CH$_2$)$_n$XR$^{13}$, O(CH$_2$)$_n$OR$^{13}$, or

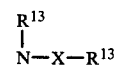

where n is 1–6; lower alkanoylamino; sulfamoyl, lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy;

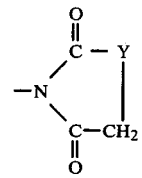

wherein Y is —NH—, —NH—lower alkyl—, —O—, —S—, or —CH$_2$O—; —S—R$^{14}$ wherein R$^{14}$ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, or

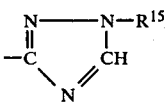

—SO$_2$R$^{13}$; —COOR$^{13}$; —OXR$^{13}$; —NH—X—R$^{13}$; —X—R$^{13}$; —OCO—R$^{13}$; —CONR$^{15}$R$^{15}$; —SO$_2$NR$^{15}$R$^{15}$; wherein R$^{13}$ and X are as defined above and each R$^{15}$ is selected from H and R$^{13}$; lower alkoxy, lower alkoxy substituted with hydroxy, cyano, lower alkanoyloxy, or lower alkoxy; phenoxy; phenoxy substituted with one or more of lower alkyl, lower alkoxy or halogen; or R$^8$ and R$^9$ combined form pentamethylene, ethyleneoxyethylene or ethylenesulfonylethylene;

R$^{10}$, R$^{11}$, and R$^{12}$ are each selected from hydrogen and lower alkyl; and R$^{16}$ is selected from —OH, —Cl, —CONH$_2$, —CONH—lower alkyl, lower alkoxy, phenoxy, —SR$^{14}$, and —OXR$^{13}$ wherein R$^{13}$ and R$^{14}$ are as defined above.

2. A compound according to claim 1 wherein A is a coupler moiety of one of the formulae

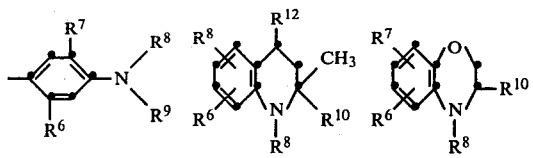

wherein

R$^6$ is lower alkyl, lower alkoxy, lower alkanoylamino, or lower alkoxycarbonylamino;
R$^7$ is hydrogen, lower alkyl, or lower alkoxy;
R$^8$ and R$^9$ are the same or different and selected from hydrogen, lower alkyl, and lower akyl substituted with hydroxy, alkoxy, alkoxyalkoxy, hydroxyalkoxy, carbamoyl, lower alkylcarbamoyl, lower alkanoylamino, sulfamoyl, lower alkylsulfamoyl, phenyl, o-chlorophenyl, p-alkoxycarbonylphenyl, p-benzyloxyphenyl, cyclohexyl, 2-pyrrolidono, phthalimido, succinimido, cyano, phenoxy, alkylsulfonyl, phthalimidinyl, benzoylsulfonicimidyl, triazolylthio, lower alkylsulfonamido, —SO$_2$NH$_2$, —SO$_2$NHR, phenylsulfonamido, lower alkoxycarbonylamino, lower alkylcarbamoyloxy, lower alkoxycarbonyl, lower alkoxycarbonyloxy, 2-benzothiazolylthio,

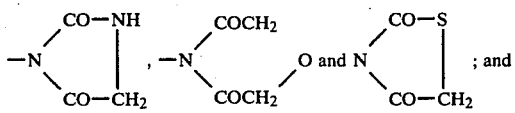

R$^{10}$ and R$^{12}$ are each hydrogen or lower alkyl.

3. An azo compound according to claim 1 having the formula

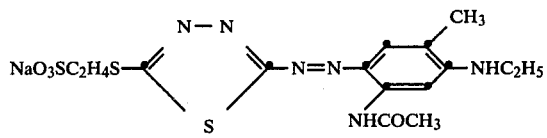

4. An azo compound according to claim 1 having the formula

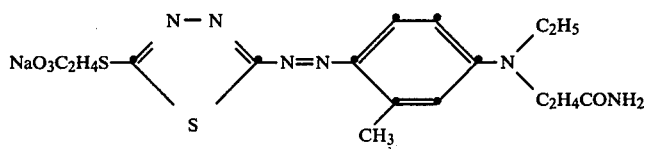

5. An azo compound according to claim 1 having the formula

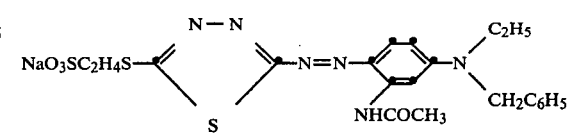

6. An azo compound according to claim 1 having the formula

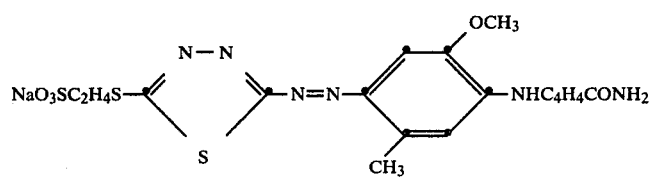

7. An azo compound according to claim 1 having the formula

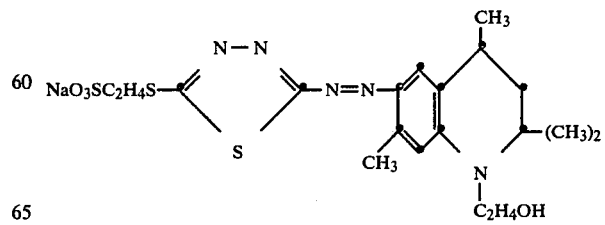

8. An azo compound according to claim 1 having the formula

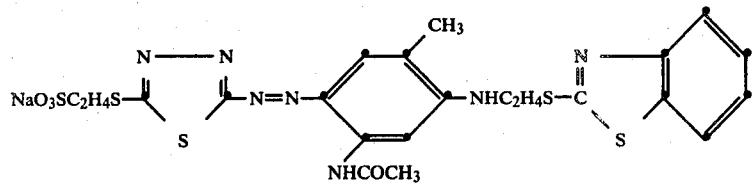
9. An azo compound according to claim 1 having the formula
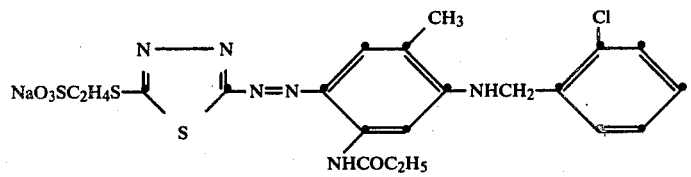
10. An azo compound according to claim 1 having the formula
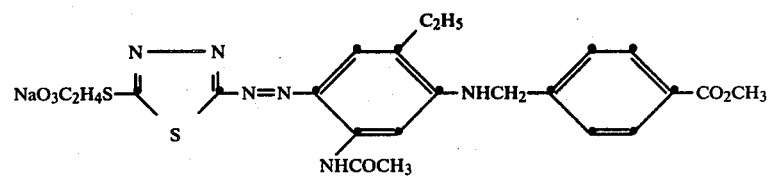
11. An azo compound according to claim 1 having the formula
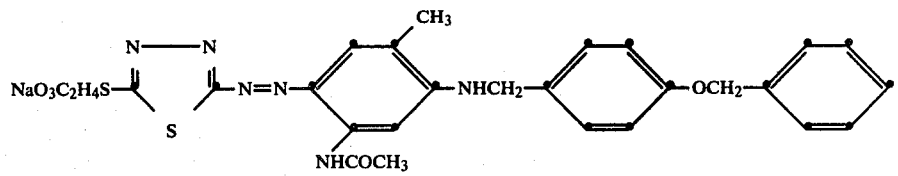
* * * * *

UNITED STATES PATENT AND TRADEMARK OFFICE
CERTIFICATE OF CORRECTION

PATENT NO. : 4,407,749   Page 1 of 3
DATED : October 4, 1983
INVENTOR(S) : Max A. Weaver et al It is certified that error appears in the above—identified patent and that said Letters Patent is hereby corrected as shown below:

Column 30, line 22, delete the comma following "-CO-" and insert ---in the above formula -NH-X-$R^{13}$,---.

Column 30, line 23, delete "lower alkylcarbamoyl,".

Column 30, lines 26-27, delete "groups selected from" and substitute therefor ---of---.

Column 30, line 28, "phenyl or" should read ---phenyl;---.

Column 30, line 32, after "alkyl" delete "or" and substitute therefor ---of---.

Column 30, lines 37-45, should read "gen, cyano, sulfamoyl, -OH, -$OR^{13}$, -$OXR^{13}$, -$SR^{13}$, -$NHXR^{13}$, -$SO_2NHR^{13}$, -$O(CH_2)_nXR^{13}$, -$O(CH_2)_nOR^{13}$, or -$N(R^{13})-X-R^{13}$".

Column 30, line 46, "where" should read ---wherein---.

Column 30, lines 46-47, delete "lower alkanoylamino; sulfamoyl, lower alkylsulfamoyl;".

Column 30, lines 48-49, delete "lower alkylsulfonamido;".

UNITED STATES PATENT AND TRADEMARK OFFICE
CERTIFICATE OF CORRECTION

PATENT NO. : 4,407,749
DATED : October 4, 1983
INVENTOR(S) : Max A. Weaver et al It is certified that error appears in the above-identified patent and that said Letters Patent are hereby corrected as shown below:

Column 30, line 50, delete "lower alkylcarbamoyloxy;".

Column 31, line 7, delete "-$SO_2R^{13}$; -$COOR^{13}$;".

Column 31, line 8, delete "-$OCO-R^{13}$;".

Column 31, line 11, "alkoxy," should read ---alkoxy;---.

Column 31, line 18, after "from" insert ---hydrogen, lower alkyl,---.

Column 31, line 2 of claim 2, "of one of the formulae" should read ---having the formula---.

Column 31, lines 34-41 should read

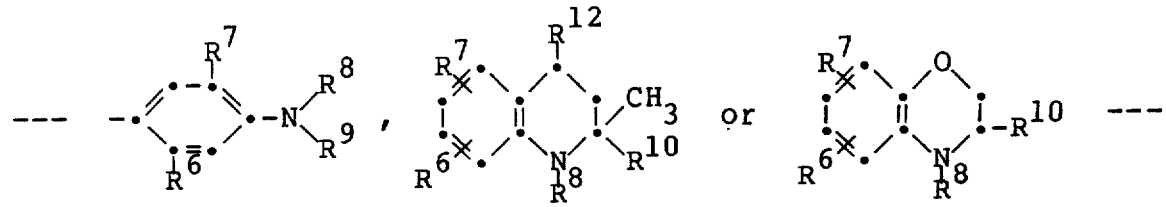

Column 31, line 66, delete "-$SO_2NH_2$, -$SO_2NHR$,".

UNITED STATES PATENT AND TRADEMARK OFFICE
CERTIFICATE OF CORRECTION

PATENT NO. : 4,407,749
DATED : October 4, 1983
INVENTOR(S) : Max A. Weaver et al It is certified that error appears in the above—identified patent and that said Letters Patent is hereby corrected as shown below:

Column 32, lines 4-8, the second chemical formula should read

---  ---

Column 32, lines 43-53, the formula of claim 6, "$C_4$" should read ---$C_2$---.

Signed and Sealed this

First Day of January 1985

[SEAL]

Attest:

Attesting Officer

GERALD J. MOSSINGHOFF

Commissioner of Patents and Trademarks